(12) United States Patent
Makino et al.

(10) Patent No.: US 11,215,478 B2
(45) Date of Patent: *Jan. 4, 2022

(54) MAGNETIC SENSOR AND POSITION DETECTION DEVICE

(71) Applicant: TDK CORPORATION, Tokyo (JP)

(72) Inventors: Kenzo Makino, Tokyo (JP); Tsuyoshi Umehara, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/064,873

(22) Filed: Oct. 7, 2020

(65) Prior Publication Data

US 2021/0018337 A1 Jan. 21, 2021

Related U.S. Application Data

(63) Continuation of application No. 16/160,144, filed on Oct. 15, 2018, now Pat. No. 10,830,614.

(30) Foreign Application Priority Data

Mar. 12, 2018 (JP) .................................. 2018-044697

(51) Int. Cl.
*G01D 5/16* (2006.01)
(52) U.S. Cl.
CPC ...................................... *G01D 5/16* (2013.01)
(58) Field of Classification Search
CPC . G01D 5/16; G01D 5/145; G02B 7/08; G02B 27/646; G02B 7/02; G01B 7/00; H01L 43/06; H01L 43/08; G01R 33/091

(Continued)

(56) References Cited

U.S. PATENT DOCUMENTS

| 5,561,368 A | 10/1996 | Dovek et al. |
| 2003/0134665 A1* | 7/2003 | Kato ....................... A63F 13/00 455/566 |

(Continued)

FOREIGN PATENT DOCUMENTS

| CN | 1085843 C | 5/2002 |
| CN | 203745708 U | 7/2014 |

(Continued)

OTHER PUBLICATIONS

Oct. 23, 2020 Offie Action issued in Chinese Patent Application No. 201811456750.4.

*Primary Examiner* — Christopher P McAndrew
(74) *Attorney, Agent, or Firm* — Oliff PLC

(57) ABSTRACT

A magnetic sensor generates a detection signal that varies according to the strength of a target magnetic field at a detection position in a reference plane. The magnetic sensor includes a magnetoresistive element. The magnetoresistive element includes a magnetization pinned layer having a magnetization in a first direction, and a free layer having a magnetization whose direction is variable according to the direction of an acting magnetic field, the acting magnetic field being a composite magnetic field of all magnetic fields acting on the free layer. The free layer has uniaxial magnetic anisotropy such that an easy axis of magnetization is oriented in a direction parallel to a second direction. In the reference plane, both of two directions orthogonal to the second direction are different from the direction of the target magnetic field.

17 Claims, 10 Drawing Sheets

(58) Field of Classification Search
USPC .................................................. 324/207.21
See application file for complete search history.

(56) References Cited

U.S. PATENT DOCUMENTS

| | | | |
|---|---|---|---|
| 2006/0120132 A1* | 6/2006 | Parkin | G11C 11/14 365/80 |
| 2007/0019338 A1 | 1/2007 | Childress et al. | |
| 2007/0047152 A1 | 3/2007 | Furukawa et al. | |
| 2008/0100290 A1 | 5/2008 | Shoji | |
| 2008/0316655 A1* | 12/2008 | Shoji | G01R 33/093 360/324.1 |
| 2011/0074406 A1 | 3/2011 | Mather et al. | |
| 2014/0009145 A1* | 1/2014 | Suto | G01R 33/093 324/252 |
| 2014/0021571 A1 | 1/2014 | Lei et al. | |
| 2014/0021943 A1* | 1/2014 | Watanabe | G01D 5/145 324/207.21 |
| 2015/0198816 A1 | 7/2015 | Dong | |
| 2015/0204696 A1* | 7/2015 | Hirota | G01D 5/16 324/207.21 |
| 2015/0260546 A1* | 9/2015 | Hirota | G01D 5/14 324/207.21 |
| 2016/0169707 A1* | 6/2016 | Hirota | G01D 5/145 702/151 |
| 2019/0293734 A1* | 9/2019 | Watanabe | G01R 33/0017 |

FOREIGN PATENT DOCUMENTS

| | | |
|---|---|---|
| JP | 2009-150786 A | 7/2009 |
| JP | 2015-141329 A | 8/2015 |
| JP | 2017-103378 A | 6/2017 |
| JP | 2017-181240 A | 10/2017 |

* cited by examiner

MAGNETIC SENSOR AND POSITION DETECTION DEVICE

This application a continuation of U.S. application Ser. No. 16/160,144, filed Oct. 15, 2018; which claims priority to Japanese Application No. 2018-044697 filed Mar. 12, 2018; the disclosures of both of which are incorporated by reference herein in their entirety.

BACKGROUND OF THE INVENTION

1. Field of the Invention

The present invention relates to a magnetic sensor, and a position detection device using the magnetic sensor.

2. Description of the Related Art

Position detection devices using magnetic sensors have been used for a variety of applications. The position detection devices using magnetic sensors will hereinafter be referred to as magnetic position detection devices. For example, the magnetic position detection devices are used for detecting a lens position in a camera module having an autofocus mechanism incorporated in a smartphone.

Examples of known magnetic sensors include one that uses a spin-valve magnetoresistive element. The spin-valve magnetoresistive element includes a magnetization pinned layer having a magnetization whose direction is fixed, a free layer having a magnetization whose direction is variable according to the direction of an applied magnetic field, and a gap layer located between the magnetization pinned layer and the free layer.

In the magnetic sensor using the spin-valve magnetoresistive element, the magnetoresistive element desirably operates in its linear region. The linear region of the magnetoresistive element refers to, in a characteristic chart showing a relationship between a magnetic field applied to the magnetoresistive element and the resistance value of the magnetoresistive element, a region where the resistance value of the magnetoresistive element varies linearly or almost linearly with respect to changes in the applied magnetic field.

Known techniques for adjusting the operation region of the magnetoresistive element so that the magnetoresistive element operates in its linear region include a technique of applying a bias magnetic field to the magnetoresistive element, and a technique of providing the free layer of the magnetoresistive element with uniaxial magnetic anisotropy such as magnetic shape anisotropy.

US 2007/0047152 A1 discloses a magnetic field detection apparatus including a magnetoresistive element and a bias unit for applying a bias magnetic field to the magnetoresistive element.

US 2008/0100290 A1 discloses a magnetic sensor including first and second magnetoresistive elements each of which includes a free layer for generating an anisotropic magnetic field.

Now, a description will be given of a problem with a magnetic sensor that uses a magnetoresistive element including a free layer having uniaxial magnetic anisotropy and that is configured to detect a magnetic field whose direction is constant or limited to a predetermined range. Examples of such a magnetic sensor include one used in a position detection device.

In the foregoing magnetic sensor, the magnetization direction of the free layer without any applied magnetic field is set to an initial direction in an initial state before use. The initial direction is one of two mutually opposite directions parallel to the easy axis of magnetization of the free layer. After the magnetic sensor starts to be used, the magnetization direction of the free layer varies according to the direction and strength of a magnetic field to be detected by the magnetic sensor. Even after start of use of the magnetic sensor, ideally, the magnetization direction of the free layer returns to its initial direction upon disappearance of the applied magnetic field.

However, in the foregoing magnetic sensor, a reversal of the magnetization of the free layer may occur due to, for example, a disturbance magnetic field applied thereto. If the magnetization of the free layer is reversed, detection values obtained thereafter with the magnetic sensor can be different from those that would otherwise be obtained.

The magnetic sensor described in US 2008/0100290 A1 is provided with means for applying to the first and second magnetoresistive elements a refresh magnetic field that serves to align the magnetization directions of the free layers in the first and second magnetoresistive elements to a certain direction when their magnetization directions have been disturbed by a disturbance magnetic field. Such a magnetic sensor, however, is disadvantageous in that additional means and processing for applying the refresh magnetic field are needed.

SUMMARY OF THE INVENTION

It is an object of the present invention to provide a magnetic sensor that uses a magnetoresistive element including a free layer having uniaxial magnetic anisotropy, the magnetic sensor being capable of easily restoring an original direction of magnetization of the free layer even when a reversal of the magnetization of the free layer occurs, and to provide a position detection device including such a magnetic sensor.

A magnetic sensor of a first aspect of the present invention is configured to generate a detection signal that varies according to a strength of a detection-target magnetic field at a detection position in a reference plane, the detection-target magnetic field being in a predetermined direction. The magnetic sensor of the first aspect of the invention includes at least one magnetoresistive element. The at least one magnetoresistive element includes a magnetization pinned layer having a magnetization in a first direction, and a free layer having a magnetization whose direction is variable according to a direction of an acting magnetic field, the acting magnetic field being a composite magnetic field of all magnetic fields acting on the free layer. The free layer has uniaxial magnetic anisotropy such that an easy axis of magnetization is oriented in a direction parallel to a second direction. The reference plane is a plane containing the direction of the detection-target magnetic field, the first direction, and the second direction. In the reference plane, both of two directions orthogonal to the second direction are different from the direction of the detection-target magnetic field. In the magnetic sensor of the first aspect of the invention, the uniaxial magnetic anisotropy may be magnetic shape anisotropy.

In the magnetic sensor of the first aspect of the invention, the second direction may be the direction of the magnetization of the free layer set in an initial state. An angle formed between the second direction and the direction of the detection-target magnetic field may be an acute angle.

In the magnetic sensor of the first aspect of the invention, one of two directions orthogonal to the first direction may be included in a variable range of the direction of the acting magnetic field. In such a case, the one of the two directions orthogonal to the first direction may be the same as a direction in the middle of the variable range of the direction of the acting magnetic field.

In the magnetic sensor of the first aspect of the invention, in the reference plane, one of the two directions orthogonal to the second direction may form an angle greater than 0° and smaller than 45 with the direction of the detection-target magnetic field.

In the magnetic sensor of the first aspect of the invention, an anisotropic magnetic field acting on the free layer due to the uniaxial magnetic anisotropy may have a strength lower than twice a maximum value of the strength of the detection-target magnetic field.

A position detection device of the first aspect of the invention is a device for detecting a position of a target object that is variable in position. The position detection device of the first aspect of the invention includes a magnetic field generation unit for generating a predetermined magnetic field, and a magnetic sensor for detecting a detection-target magnetic field at a detection position in a reference plane, the detection-target magnetic field being in a predetermined direction and being part of the predetermined magnetic field. The magnetic field generation unit and the magnetic sensor are configured so that when the position of the target object varies, the detection-target magnetic field varies in strength at the detection position in the reference plane. The magnetic sensor is configured to generate a detection signal that varies according to the strength of the detection-target magnetic field at the detection position in the reference plane.

In the position detection device of the first aspect of the invention, the magnetic sensor includes at least one magnetoresistive element. The at least one magnetoresistive element includes a magnetization pinned layer having a magnetization in a first direction, and a free layer having a magnetization whose direction is variable according to a direction of an acting magnetic field, the acting magnetic field being a composite magnetic field of all magnetic fields acting on the free layer. The free layer has uniaxial magnetic anisotropy such that an easy axis of magnetization is oriented in a direction parallel to a second direction. The reference plane is a plane containing the direction of the detection-target magnetic field, the first direction, and the second direction. In the reference plane, both of two directions orthogonal to the second direction are different from the direction of the detection-target magnetic field.

A magnetic sensor of a second aspect of the invention is configured to generate a detection signal that varies according to a strength and a direction of a detection-target magnetic field at a detection position in a reference plane. The direction of the detection-target magnetic field at the detection position varies within a variable range below 180° in the reference plane. The magnetic sensor of the second aspect of the invention includes at least one magnetoresistive element. The at least one magnetoresistive element includes a magnetization pinned layer having a magnetization in a first direction, and a free layer having a magnetization whose direction is variable according to a direction of an acting magnetic field, the acting magnetic field being a composite magnetic field of all magnetic fields acting on the free layer. The free layer has uniaxial magnetic anisotropy such that an easy axis of magnetization is oriented in a direction parallel to a second direction. The reference plane is a plane containing the direction of the detection-target magnetic field, the first direction, and the second direction. In the reference plane, neither of two directions orthogonal to the second direction is included in the variable range of the direction of the detection-target magnetic field. In the magnetic sensor of the second aspect of the invention, the uniaxial magnetic anisotropy may be magnetic shape anisotropy.

In the magnetic sensor of the second aspect of the invention, the second direction may be the direction of the magnetization of the free layer set in an initial state. An angle formed between the second direction and the direction of the detection-target magnetic field may be an acute angle.

In the magnetic sensor of the second aspect of the invention, one of two directions orthogonal to the first direction may be included in a variable range of the direction of the acting magnetic field. In such a case, the one of the two directions orthogonal to the first direction may be the same as a direction in the middle of the variable range of the direction of the acting magnetic field.

In the magnetic sensor of the second aspect of the invention, an anisotropic magnetic field acting on the free layer due to the uniaxial magnetic anisotropy may have a strength lower than twice a maximum value of the strength of the detection-target magnetic field.

A position detection device of the second aspect of the invention is a device for detecting a position of a target object that is variable in position. The position detection device of the second aspect of the invention includes a magnetic field generation unit for generating a predetermined magnetic field, and a magnetic sensor for detecting a detection-target magnetic field at a detection position in a reference plane, the detection-target magnetic field being part of the predetermined magnetic field. The magnetic field generation unit and the magnetic sensor are configured so that when the position of the target object varies, the direction of the detection-target magnetic field at the detection position in the reference plane varies within a variable range below 180°. The magnetic sensor is configured to generate a detection signal that varies according to the strength and the direction of the detection-target magnetic field at the detection position in the reference plane.

In the position detection device of the second aspect of the invention, the magnetic sensor includes at least one magnetoresistive element. The at least one magnetoresistive element includes a magnetization pinned layer having a magnetization in a first direction, and a free layer having a magnetization whose direction is variable according to a direction of an acting magnetic field, the acting magnetic field being a composite magnetic field of all magnetic fields acting on the free layer. The free layer has uniaxial magnetic anisotropy such that an easy axis of magnetization is oriented in a direction parallel to a second direction. The reference plane is a plane containing the direction of the detection-target magnetic field, the first direction, and the second direction. In the reference plane, neither of two directions orthogonal to the second direction is included in the variable range of the direction of the detection-target magnetic field.

In the position detection device of the second aspect of the invention, the magnetic field generation unit may include a first partial magnetic field generation unit for generating a first partial magnetic field, and a second partial magnetic field generation unit for generating a second partial magnetic field. The predetermined magnetic field is a composite magnetic field of the first partial magnetic field and the second partial magnetic field. When the position of the target object varies, the strength of a second magnetic field component varies whereas none of the strength and direction of a first magnetic field component and the direction of the second magnetic field component vary, wherein the first magnetic field component is a component of the first partial magnetic field at the detection position, the component being parallel to the reference plane, and the second magnetic field component is a component of the second partial magnetic field at the detection position, the component being parallel to the reference plane. In such a case, the detection-target magnetic field is a composite magnetic field of the first magnetic field component and the second magnetic field component.

According to the magnetic sensor and the position detection device of the first aspect of the invention, even when a reversal of magnetization of the free layer occurs, the detection-target magnetic field in a predetermined direction acts on the free layer to restore the magnetization direction of the free layer to its original direction easily.

According to the magnetic sensor and the position detection device of the second aspect of the invention, even when a reversal of magnetization of the free layer occurs, the detection-target magnetic field whose direction varies within a predetermined variable range acts on the free layer to restore the magnetization direction of the free layer to its original direction easily.

Other and further objects, features and advantages of the present invention will appear more fully from the following description.

DETAILED DESCRIPTION OF THE PREFERRED EMBODIMENTS

First Embodiment

Figure 1:
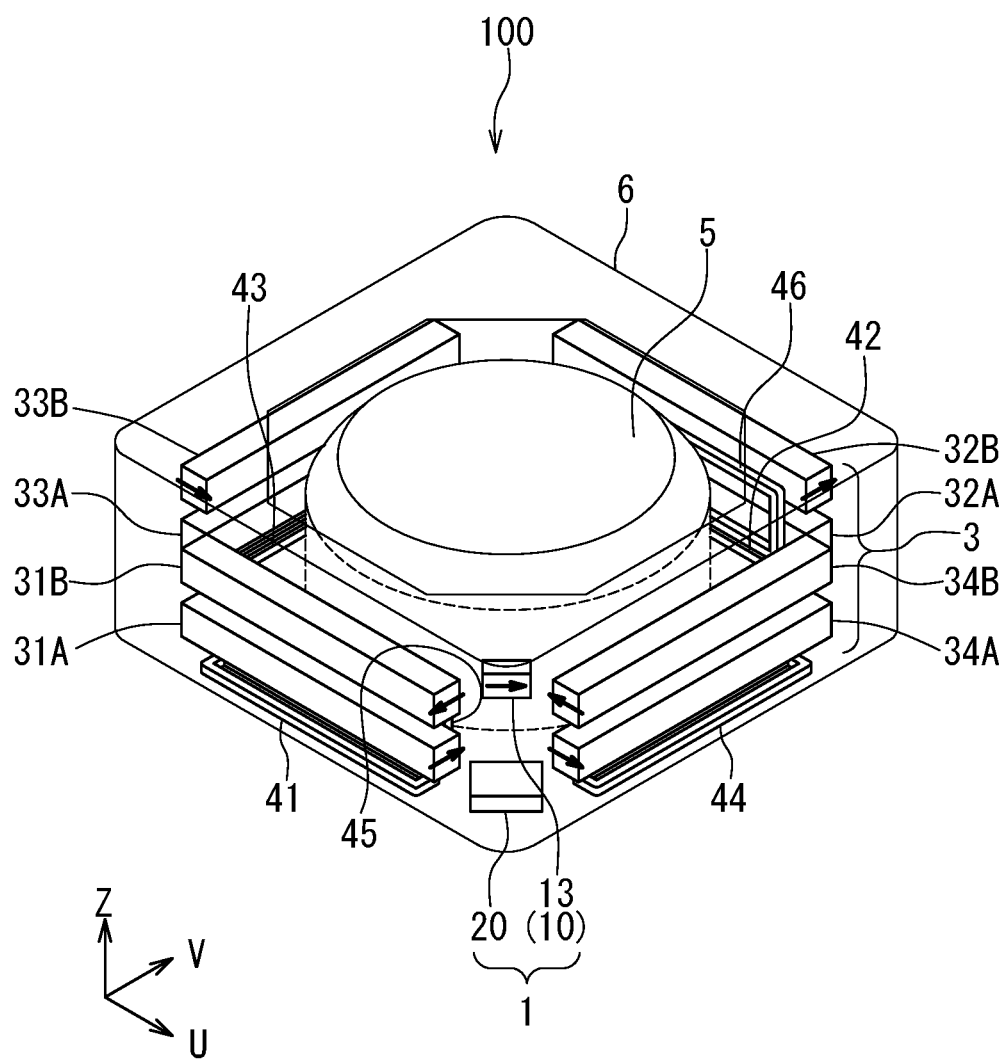
FIG. 1 is a perspective view of a camera module including a position detection device according to a first embodiment of the invention.
Figure 2:
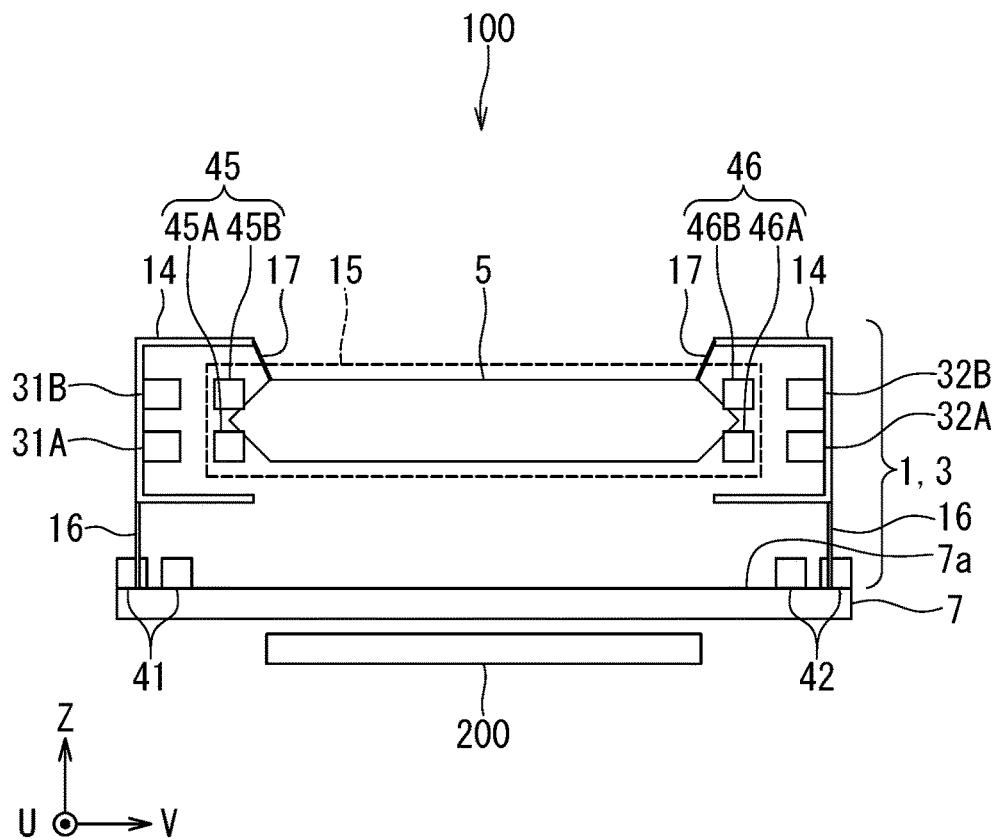
FIG. 2 illustrates an internal schematic view of the camera module of FIG. 1.

Preferred embodiments of the present invention will now be described in detail with reference to the drawings. First, reference is made to FIG. 1 and FIG. 2 to describe the configuration of a camera module including a position detection device according to a first embodiment of the invention. FIG. 1 is a perspective view of the camera module 100. FIG. 2 is a schematic internal view of the camera module 100. For ease of understanding, in FIG. 2 the parts of the camera module 100 are drawn on a different scale and in a different layout than those in FIG. 1. The camera module 100 constitutes, for example, a portion of a camera for a smartphone having an optical image stabilization mechanism and an autofocus mechanism, and is used in combination with an image sensor 200 that uses CMOS or other similar techniques.

The camera module 100 includes a position detection device 1 according to the embodiment, and a driving device 3, a lens 5, a housing 6 and a substrate 7. The position detection device 1 according to the present embodiment is a magnetic position detection device, and is used to detect the position of the lens 5 during automatic focusing. The lens 5 is a target object for the position detection device 1 according to the present embodiment, and is variable in position.

The driving device 3 is to move the lens 5. The housing 6 is to protect the position detection device 1 and the driving device 3. The substrate 7 has a top surface 7a. FIG. 1 omits the illustration of the substrate 7, and FIG. 2 omits the illustration of the housing 6.

Now, we define U, V, and Z directions as shown in FIGS. 1 and 2. The U, V, and Z directions are orthogonal to one another. In the present embodiment, the Z direction is a direction perpendicular to the top surface 7a of the substrate 7. In FIG. 2 the Z direction is the upward direction. The U and V directions are both parallel to the top surface 7a of the substrate 7. The opposite directions to the U, V, and Z directions will be referred to as −U, −V, and −Z directions, respectively. As used herein, the term "above" refers to positions located forward of a reference position in the Z direction, and "below" refers to positions located on a side of the reference position opposite from "above".

The lens 5 is disposed above the top surface 7a of the substrate 7 in such an orientation that the direction of its optical axis is parallel to the Z direction. The substrate 7 has an opening (not illustrated) for passing light that has passed through the lens 5. As shown in FIG. 2, the camera module 100 is in alignment with the image sensor 200 so that light that has passed through the lens 5 and the non-illustrated opening will enter the image sensor 200.

Figure 3:
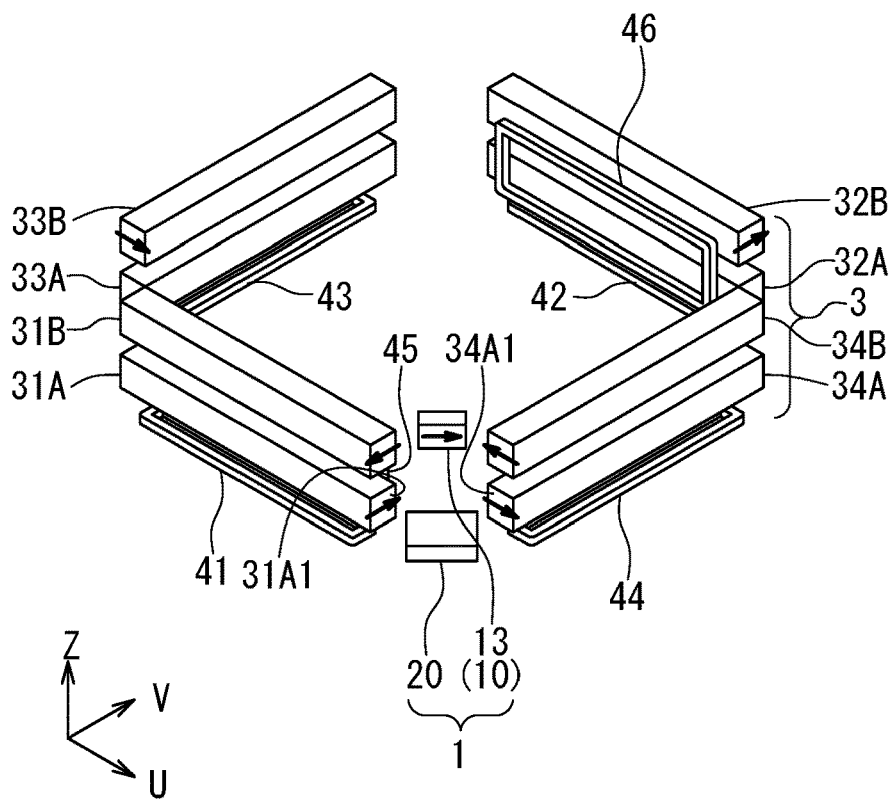
FIG. 3 is a perspective view of the position detection device and a driving device of FIG. 1.
Figure 4:
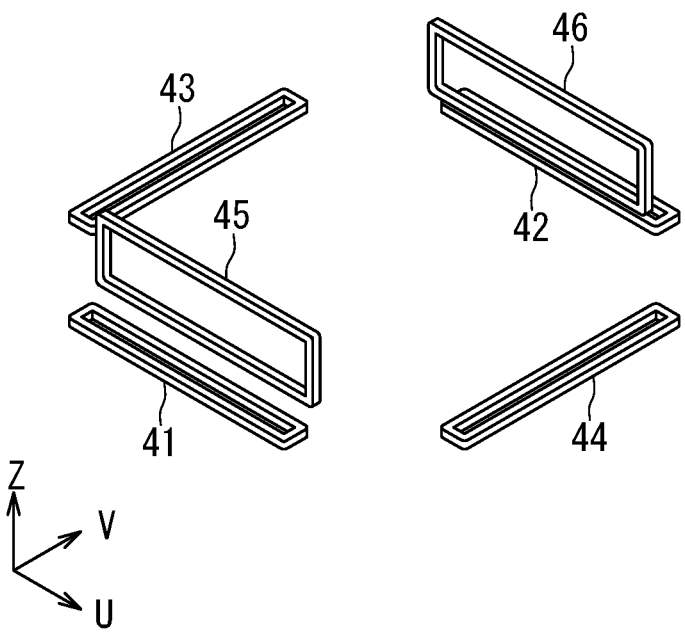
FIG. 4 is a perspective view of a plurality of coils of the driving device of FIG. 1.
Figure 5:
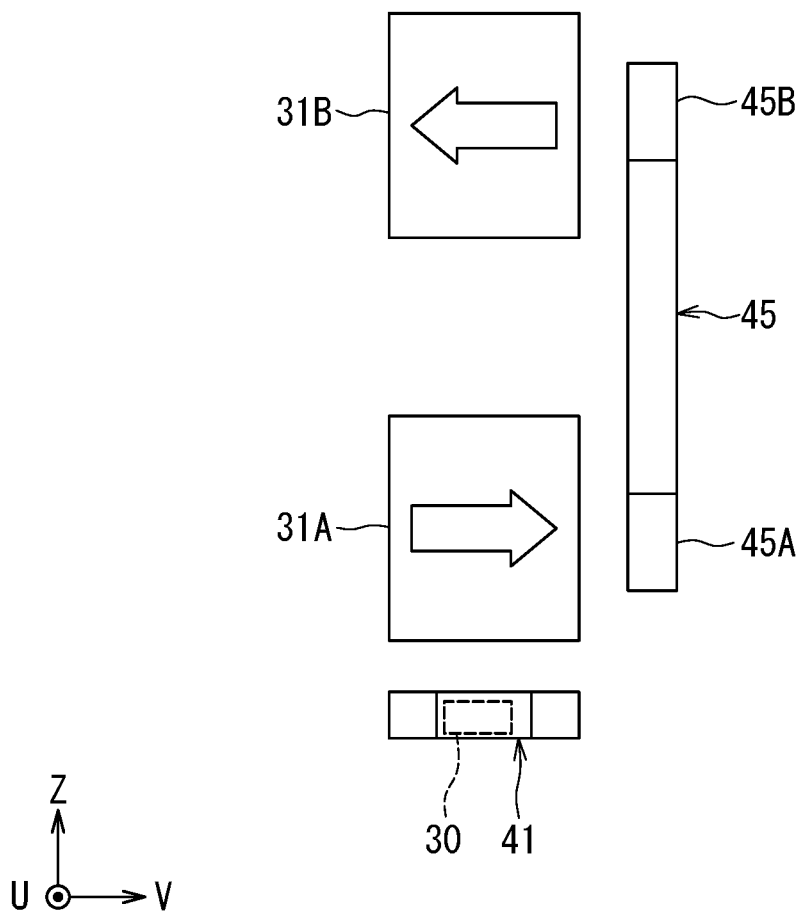
FIG. 5 is a side view illustrating the principal parts of the driving device of FIG. 1.

The position detection device 1 and the driving device 3 according to the present embodiment will now be described in detail with reference to FIG. 2 to FIG. 5. FIG. 3 is a perspective view of the position detection device 1 and the driving device 3. FIG. 4 is a perspective view of a plurality of coils of the driving device 3. FIG. 5 is a side view illustrating the principal parts of the driving device 3.

The position detection device 1 includes a first holding member 14, a second holding member 15, a plurality of first wires 16, and a plurality of second wires 17. The second holding member 15 is to hold the lens 5. Although not illustrated, the second holding member 15 is shaped like a hollow cylinder so that the lens 5 is insertable in the hollow.

The second holding member 15 is provided such that its position is variable in one direction, specifically, in the direction of the optical axis of the lens 5, i.e., a direction parallel to the Z direction, relative to the first holding member 14. In the present embodiment, the first holding member 14 is shaped like a box so that the lens 5 and the second holding member 15 can be accommodated therein. The plurality of second wires 17 connect the first and second holding members 14 and 15 and support the second holding member 15 such that the second holding member 15 is movable in a direction parallel to the Z direction relative to the first holding member 14.

The first holding member 14 is provided above the top surface 7a of the substrate 7 such that its position is variable relative to the substrate 7 in a direction parallel to the U direction and in a direction parallel to the V direction. The plurality of first wires 16 connect the substrate 7 and the first holding member 14, and support the first holding member 14 such that the first holding member 14 is movable relative to the substrate 7 in a direction parallel to the U direction and in a direction parallel to the V direction. When the position of the first holding member 14 relative to the substrate 7 varies, the position of the second holding member 15 relative to the substrate 7 also varies.

The driving device 3 includes magnets 31A, 31B, 32A, 32B, 33A, 33B, 34A and 34B, and coils 41, 42, 43, 44, 45 and 46. The magnet 31A is located forward of the lens 5 in the −V direction. The magnet 32A is located forward of the lens 5 in the V direction. The magnet 33A is located forward of the lens 5 in the −U direction. The magnet 34A is located forward of the lens 5 in the U direction. The magnets 31B, 32B, 33B and 34B are located above the magnets 31A, 32A, 33A and 34A, respectively. The magnets 31A, 31B, 32A, 32B, 33A, 33B, 34A and 34B are fixed to the first holding member 14.

As shown in FIG. 3, the magnets 31A, 31B, 32A and 32B are each in the shape of a rectangular solid that is long in the U direction. The magnets 33A, 33B, 34A and 34B are each in the shape of a rectangular solid that is long in the V direction. The magnets 31A and 32B are magnetized in the V direction. The magnets 31B and 32A are magnetized in the −V direction. The magnets 33A and 34B are magnetized in the −U direction. The magnets 33B and 34A are magnetized in the U direction. In FIGS. 1 and 3, the magnetization directions of he magnets 31A, 31B, 32B, 33B, 34A and 34B are indicated by the arrows drawn to overlap the respective magnets. In FIG. 5 the magnetization directions of the magnets 31A and 31B are indicated by the arrows drawn inside the magnets 31A and 31B.

The magnet 31A has an end face 31A1 located at the end of the magnet 31A in the U direction. The magnet 34A has an end face 34A1 located at the end of the magnet 34A in the −V direction.

The coil 41 is located between the magnet 31A and the substrate 7. The coil 42 is located between the magnet 32A and the substrate 7. The coil 43 is located between the magnet 33A and the substrate 7. The coil 44 is located between the magnet 34A and the substrate 7. The coil 45 is located between the lens 5 and the magnets 31A and 31B.

The coil 46 is located between the lens 5 and the magnets 32A and 32B. The coils 41, 42, 43 and 44 are fixed to the substrate 7. The coils 45 and 46 are fixed to the second holding member 15.

The coil 41 is subjected mainly to a magnetic field generated by the magnet 31A. The coil 42 is subjected mainly to a magnetic field generated by the magnet 32A. The coil 43 is subjected mainly to a magnetic field generated by the magnet 33A. The coil 44 is subjected mainly to a magnetic field generated by the magnet 34A.

As shown in FIGS. 2, 4 and 5, the coil 45 includes a first conductor portion 45A extending along the magnet 31A in the U direction, a second conductor portion 45B extending along the magnet 31B in the U direction, and two third conductor portions connecting the first and second conductor portions 45A and 45B. As shown in FIGS. 2 and 4, the coil 46 includes a first conductor portion 46A extending along the magnet 32A in the U direction, a second conductor portion 46B extending along the magnet 32B in the U direction, and two third conductor portions connecting the first and second conductor portions 46A and 46B.

The first conductor portion 45A of the coil 45 is subjected mainly to a component in the V direction of the magnetic field generated by the magnet 31A. The second conductor portion 45B of the coil 45 is subjected mainly to a component in the −V direction of a magnetic field generated by the magnet 31B. The first conductor portion 46A of the coil 46 is subjected mainly to a component in the −V direction of the magnetic field generated by the magnet 32A. The second conductor portion 46B of the coil 46 is subjected mainly to a component in the V direction of a magnetic field generated by the magnet 32B.

The driving device 3 further includes a magnetic sensor 30 disposed on the inner side of one of the coils 41 and 42 and fixed to the substrate 7, and a magnetic sensor 30 disposed on the inner side of one of the coils 43 and 44 and fixed to the substrate 7. Assume here that the two magnetic sensors 30 are disposed on the inner sides of the coils 41 and 44, respectively. As will be described later, the two magnetic sensors 30 are used to adjust the position of the lens 5 to reduce the effect of hand-induced camera shake.

The magnetic sensor 30 disposed on the inner side of the coil 41 detects the magnetic field generated by the magnet 31A and generates a signal corresponding to the position of the magnet 31A. The magnetic sensor 30 disposed on the inner side of the coil 44 detects the magnetic field generated by the magnet 34A and generates a signal corresponding to the position of the magnet 34A. For example, the magnetic sensors 30 are constructed of elements for detecting magnetic fields, such as Hall elements.

Reference is now made to FIG. 2 to FIG. 5 to describe the operation of the driving device 3. The driving device 3 constitutes part of optical image stabilization and autofocus mechanisms. Such mechanisms will be briefly described first. A control unit (not illustrated) external to the camera module 100 controls the driving device 3, the optical image stabilization mechanism and the autofocus mechanism.

The optical image stabilization mechanism is configured to detect hand-induced camera shake using, for example, a gyrosensor external to the camera module 100. Upon detection of hand-induced camera shake by the optical image stabilization mechanism, the non-illustrated control unit controls the driving device 3 so as to vary the position of the lens 5 relative to the substrate 7 depending on the mode of the camera shake. This stabilizes the absolute position of the lens 5 to reduce the effect of the camera shake. The position of the lens 5 relative to the substrate 7 is varied in a direction parallel to the U direction or parallel to the V direction, depending on the mode of the camera shake.

The autofocus mechanism is configured to detect a state in which focus is achieved on the subject, using, for example, an image sensor 200 or an autofocus sensor. Using the driving device 3, the non-illustrated control unit varies the position of the lens 5 relative to the substrate 7 in a direction parallel to the Z direction so as to achieve focus on the subject. This enables automatic focusing on the subject.

Next, a description will be given of the operation of the driving device 3 related to the optical image stabilization mechanism. When currents are passed through the coils 41 and 42 by the non-illustrated control unit, the first holding member 14 with the magnets 31A and 32A fixed thereto moves in a direction parallel to the V direction due to interaction between the magnetic fields generated by the magnets 31A and 32A and the magnetic fields generated by the coils 41 and 42. As a result, the lens 5 also moves in the direction parallel to the V direction. On the other hand, when currents are passed through the coils 43 and 44 by the non-illustrated control unit, the first holding member 14 with the magnets 33A and 34A fixed thereto moves in a direction parallel to the U direction due to interaction between the magnetic fields generated by the magnets 33A and 34A and the magnetic fields generated by the coils 43 and 44. As a result, the lens 5 also moves in the direction parallel to the U direction. The non-illustrated control unit detects the position of the lens 5 by measuring signals corresponding to the positions of the magnets 31A and 34A, which are generated by the two magnetic sensors 30.

Next, the operation of the driving device 3 related to the autofocus mechanism will be described. To move the position of the lens 5 relative to the substrate 7 in the Z direction, the non-illustrated control unit passes a current through the coil 45 such that the current flows through the first conductor portion 45A in the U direction and flows through the second conductor portion 45B in the −U direction, and passes a current through the coil 46 such that the current flows through the first conductor portion 46A in the −U direction and flows through the second conductor portion 46B in the U direction. These currents and the magnetic fields generated by the magnets 31A, 31B, 32A and 32B cause a Lorentz force in the Z direction to be exerted on the first and second conductor portions 45A and 45B of the coil 45 and the first and second conductor portions 46A and 46B of the coil 46. This causes the second holding member 15 with the coils 45 and 46 fixed thereto to move in the Z direction. As a result, the lens 5 also moves in the Z direction.

To move the position of the lens 5 relative to the substrate 7 in the −Z direction, the non-illustrated control unit passes currents through the coils 45 and 46 in directions opposite to those in the case of moving the position of the lens 5 relative to the substrate 7 in the Z direction.

Figure 6:
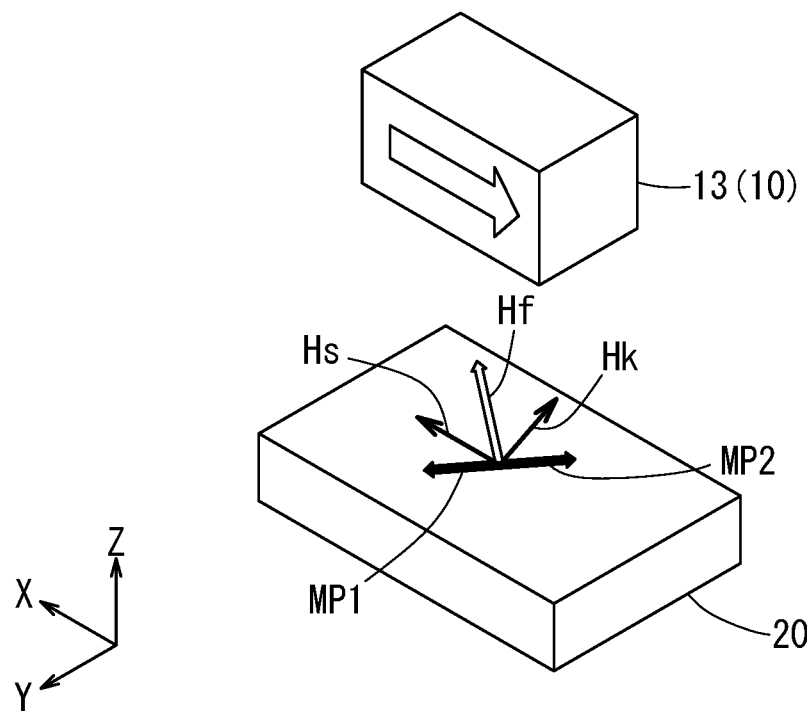
FIG. 6 is a perspective view illustrating the principal parts of the position detection device according to the first embodiment of the invention.

Now, the position detection device 1 will be described in detail. FIG. 6 is a perspective view illustrating the principal parts of the position detection device 1. As shown in FIG. 6, the position detection device 1 further includes a magnetic field generation unit 10 for generating a predetermined magnetic field, and a magnetic sensor 20. In the present embodiment, the magnetic field generation unit 10 is formed of the magnet 13. In FIGS. 1, 3 and 6, the magnetization direction of the magnet 13 is indicated by the arrow drawn to overlap the magnet 13. The predetermined magnetic field is a magnetic field that the magnet 13 generates. The magnet 13 is in the shape of a rectangular solid.

As shown in FIGS. 1 and 3, the magnet 13 is fixed to the second holding member 15 in a space near the end face 31A1 of the magnet 31A and the end face 34A1 of the magnet 34A. When the position of the second holding member 15 relative to the first holding member 14 varies in a direction parallel to the Z direction, the position of the magnet 13 relative to the first holding member 14 also varies in the direction parallel to the Z direction.

The magnetic sensor 20 includes at least one magnetoresistive (MR) element. The magnetic sensor 20 detects a detection-target magnetic field in a predetermined direction at a detection position in a reference plane, and generates a detection signal that varies according to the strength of the detection-target magnetic field. The detection-target magnetic field is a magnetic field to be detected by the magnetic sensor 20. Hereinafter, the detection-target magnetic field in a predetermined direction at the detection position will be referred to as the target magnetic field Hs. The target magnetic field Hs is part of the predetermined magnetic field that the magnet 13 generates. The magnetic sensor 20 is fixed to the substrate 7 at a position near the end face 31A1 of the magnet 31A and the end face 34A1 of the magnet 34A. The magnet 13 is disposed above the magnetic sensor 20.

The detection position is a position at which the magnetic sensor 20 detects the target magnetic field Hs. In the present embodiment, the reference plane is a plane that contains the detection position and is perpendicular to the Z direction.

In the present embodiment, the magnetic field generation unit 10 and the magnetic sensor 20 are configured so that when the position of the lens 5 relative to the substrate 7 varies in a direction parallel to the Z direction, the strength of the target magnetic field Hs at the detection position varies. More specifically, when the position of the lens 5 relative to the substrate 7 varies in a direction parallel to the Z direction, the position of the magnet 13 relative to the magnetic sensor 20 also varies in the direction parallel to the Z direction. This varies the distance between the detection position and the magnet 13, and as a result, varies the strength of the target magnetic field Hs.

Now, X and Y directions are defined as shown in FIG. 6. Both the X and Y directions are parallel to the top surface 7a (see FIG. 2) of the substrate 7. The X direction is the direction rotated by 45° from the −U direction toward the −V direction. The Y direction is the direction rotated by 45° from the −V direction toward the U direction. The opposite directions to the X and Y directions will be referred to as −X and −Y directions, respectively.

In FIG. 6 the arrow Hs indicates the strength and direction of the target magnetic field Hs. In the present embodiment, the target magnetic field Hs is in the X direction. The other arrows in FIG. 6 will be described later.

Figure 7:
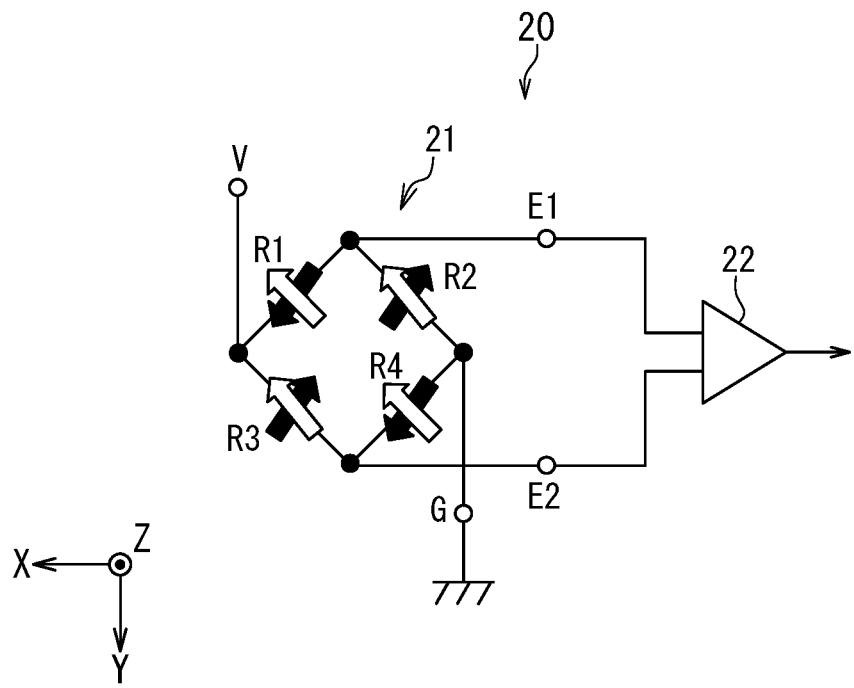
FIG. 7 is a circuit diagram illustrating the configuration of a magnetic sensor of the first embodiment of the invention.

An example of configuration of the magnetic sensor 20 will now be described with reference to FIG. 7. FIG. 7 is a circuit diagram illustrating the configuration of the magnetic sensor 20. As shown in FIG. 7, the magnetic sensor 20 includes a Wheatstone bridge circuit 21 and a difference detector 22. The Wheatstone bridge circuit 21 includes a power supply port V configured to receive a predetermined voltage, a ground port G connected to the ground, a first output port E1, and a second output port E2.

The Wheatstone bridge circuit 21 further includes a first resistor section R1, a second resistor section R2, a third resistor section R3, and a fourth resistor section R4. The first resistor section R1 is provided between the power supply port V and the first output port E1. The second resistor section R2 is provided between the first output port E1 and the ground port G. The third resistor section R3 is provided between the power supply port V and the second output port E2. The fourth resistor section R4 is provided between the second output port E2 and the ground port G.

The first resistor section R1 includes at least one first MR element. The second resistor section R2 includes at least one second MR element. The third resistor section R3 includes at least one third MR element. The fourth resistor section R4 includes at least one fourth MR element.

In the present embodiment, specifically, the first resistor section R1 includes a plurality of first MR elements connected in series, the second resistor section R2 includes a plurality of second MR elements connected in series, the third resistor section R3 includes a plurality of third MR elements connected in series, and the fourth resistor section R4 includes a plurality of fourth MR elements connected in series.

Each of the plurality of MR elements included in the Wheatstone bridge circuit 21 is a spin-valve MR element. The spin-valve MR element includes: a magnetization pinned layer having a magnetization whose direction is fixed; a free layer having a magnetization whose direction is variable according to the direction of an acting magnetic field Hf, which is a composite magnetic field of all magnetic fields acting on the free layer; and a gap layer disposed between the magnetization pinned layer and the free layer. Hereinafter, the magnetization direction of the magnetization pinned layer in each MR element will also be referred to as the first direction.

The spin-valve MR element may be a tunneling magnetoresistive (TMR) element or a giant magnetoresistive (GMR) element. In the TMR element, the gap layer is a tunnel barrier layer. In the GMR element, the gap layer is a nonmagnetic conductive layer. The spin-valve MR element varies in resistance according to the angle that the magnetization direction of the free layer forms with the magnetization direction of the magnetization pinned layer, and has a minimum resistance when the foregoing angle is 0° and a maximum resistance when the foregoing angle is 180°. In FIG. 7, the filled arrows indicate the magnetization directions of the magnetization pinned layers of the MR elements, and the hollow arrows indicate the magnetization directions of the free layers of the MR elements.

The magnetization pinned layers of the MR elements in the resistor sections R1 and R4 have magnetizations in the same direction MP1. The magnetization pinned layers of the MR elements in the resistor sections R2 and R3 have magnetizations in a direction MP2 opposite to the direction MP1. The direction MP1 is the first direction for the MR elements in the resistor sections R1 and R4, and the direction MP2 is the first direction for the MR elements in the resistor sections R2 and R3.

The magnetization direction of the free layer of each MR element is the direction of the acting magnetic field Hf. The direction of the acting magnetic field Hf depends on the strength of the target magnetic field Hs. The electric potential at the output port E1, the electric potential at the output port E2, and the potential difference between the output ports E1 and E2 vary according to the cosine of the angle that the direction of the acting magnetic field Hf forms with the direction MP1. The difference detector 22 outputs a signal corresponding to the potential difference between the output ports E1 and E2 as a detection signal of the magnetic sensor 20. The detection signal depends on the direction of the acting magnetic field Hf, which varies according to the strength of the target magnetic field Hs. The detection signal thus varies according to the strength of the target magnetic field Hs.

Figure 8:
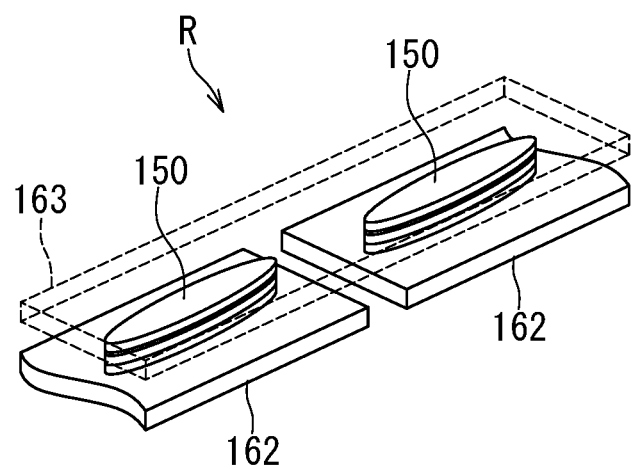
FIG. 8 is a perspective view of a part of a resistor section of FIG. 7.

An example of the configuration of the resistor sections R1, R2, R3 and R4 will now be described with reference to FIGS. 8 and 9. Hereinafter, any one of the resistor sections R1, R2, R3 and R4 will be referred to as a resistor section R. FIG. 8 is a perspective view of a part of one resistor section R. In this example, the resistor section R includes a plurality of lower electrodes 162, a plurality of MR elements 150, and a plurality of upper electrodes 163. The plurality of lower electrodes 162 are arranged on a substrate (not illustrated). Each of the lower electrodes 162 has a long slender shape. Every two lower electrodes 162 that are adjacent to each other in the longitudinal direction of the lower electrodes 162 have a gap therebetween. As shown in FIG. 8, MR elements 150 are provided on the top surfaces of the lower electrodes 162, near opposite ends in the longitudinal direction.

Figure 9:
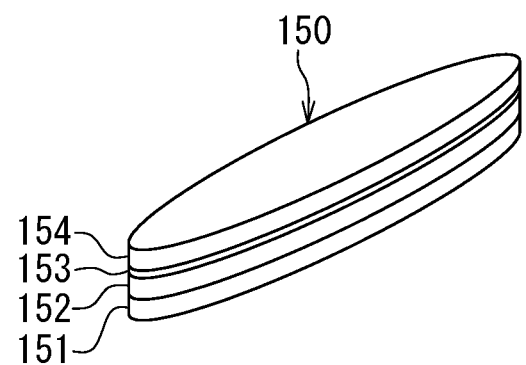
FIG. 9 is a perspective view of a magnetoresistive element of FIG. 8.

FIG. 9 is a perspective view of one MR element 150. The MR element 150 includes an antiferromagnetic layer 151, a magnetization pinned layer 152, a gap layer 153, and a free layer 154 which are stacked in this order in the direction from the lower electrode 162. The antiferromagnetic layer 151 is electrically connected to the lower electrode 162. The antiferromagnetic layer 151 is formed of an antiferromagnetic material. The antiferromagnetic layer 151 is in exchange coupling with the magnetization pinned layer 152 so as to fix the magnetization direction of the magnetization pinned layer 152. The plurality of upper electrodes 163 are arranged over the plurality of MR elements 150. Each of the upper electrodes 163 has a long slender shape, and establishes electrical connection between the respective free layers 154 of two adjacent MR elements 150 that are arranged on two lower electrodes 162 adjacent in the longitudinal direction of the lower electrodes 162. With such a configuration, in the resistor section R shown in FIG. 8 the plurality of MR elements 150 are connected in series by the plurality of lower electrodes 162 and the plurality of upper electrodes 163.

It should be appreciated that the layers 151 to 154 of each MR element 150 may be stacked in the reverse order to that shown in FIG. 9. Each MR element 150 may also be configured without the antiferromagnetic layer 151. In such a configuration, for example, a magnetization pinned layer of an artificial antiferromagnetic structure, which includes two ferromagnetic layers and a nonmagnetic metal layer interposed between the two ferromagnetic layers, may be provided in place of the antiferromagnetic layer 151 and the magnetization pinned layer 152.

In the present embodiment, the free layer 154 of each MR element 150 has uniaxial magnetic anisotropy. The free layer 154 has an easy axis of magnetization oriented in a direction parallel to a second direction Dk. FIG. 9 illustrates an example in which the uniaxial magnetic anisotropy of the free layer 154 is magnetic shape anisotropy. In this example, the entirety of the MR element 150 including the free layer 154 is shaped to be long in one direction. The easy axis of magnetization of the free layer 154 is oriented in the longitudinal direction of the free layer 154.

Figure 10:
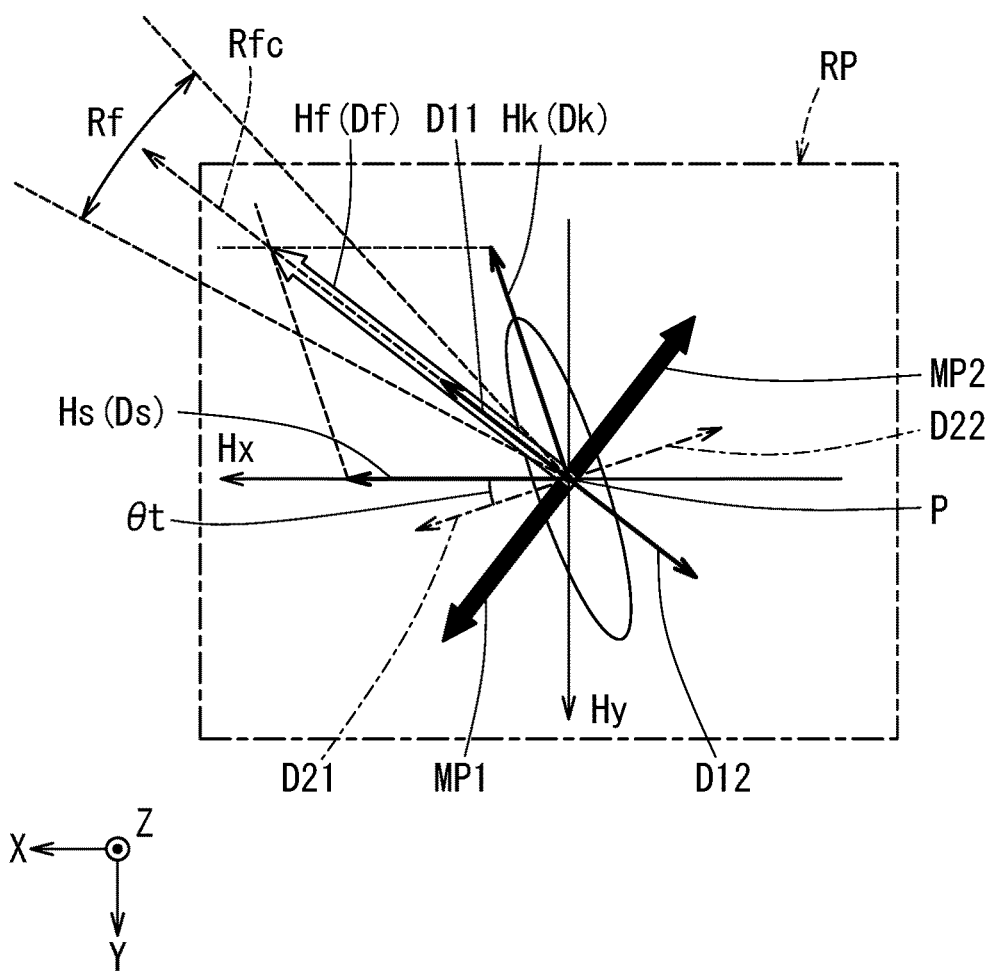
FIG. 10 is an explanatory diagram illustrating a first direction, a second direction, a detection-target magnetic field and an acting magnetic field in the first embodiment of the invention.

Reference is now made to FIG. 10 to describe in detail the first directions MP1 and MP2, the second direction Dk, the target magnetic field Hs, and the acting magnetic field Hf. In FIG. 10 the symbol RP represents the reference plane, and the symbol P represents the detection position. In FIG. 10, the axis in the X direction represents the strength Hx of a magnetic field in the X direction, and the axis in the Y direction represents the strength Hy of a magnetic field in the Y direction. FIG. 10 shows the first directions MP1 and MP2. In FIG. 10 the arrow labeled Hs (Ds) indicates the strength and the direction Ds of the target magnetic field Hs, and the arrow labeled Hf (Df) indicates the strength and the direction Df of the acting magnetic field Hf.

In the present embodiment, the second direction Dk is the magnetization direction of the free layer 154 that is set in the initial state before use of the magnetic sensor 20. During use of the magnetic sensor 20, unless there occurs a reversal of the magnetization of the free layer 154 which is originally in the second direction Dk, the free layer 154 undergoes an anisotropic magnetic field Hk in the second direction Dk because of the uniaxial magnetic anisotropy. In FIG. 10 the arrow labeled Hk (Dk) indicates the strength of the anisotropic magnetic field Hk and the direction thereof, that is, the second direction Dk.

The reference plane RP is a plane containing the direction Ds of the target magnetic field Hs, the first directions MP1 and MP2, and the second direction Dk. In the present embodiment, the acting magnetic field Hf is a composite magnetic field of the target magnetic field Hs and the anisotropic magnetic field Hk. The direction Df of the acting magnetic field Hf varies as the strength of the target magnetic field Hs varies. The position of the magnet 13 in a direction parallel to the Z direction varies within a predetermined movable range. Accordingly, the strength of the target magnetic field Hs varies within a predetermined range, and the direction Df of the acting magnetic field Hf also varies within a predetermined variable range. In FIG. 10, the symbol Rf represents the variable range of the direction Df of the acting magnetic field Hf, and the symbol Rfc represents the direction in the middle of the variable range Rf of the direction Df of the acting magnetic field Hf.

In FIG. 6 the arrow labeled MP1 represents the direction MP1, the arrow labeled MP2 represents the direction MP2, the arrow labeled Hk represents the strength and direction of the anisotropic magnetic field Hk, and the arrow labeled Hf represents the strength and direction of the acting magnetic field Hf.

Two directions orthogonal to the first directions MP1 and MP2 in the reference plane RP will be referred to as directions D11 and D12. Two directions orthogonal to the second direction Dk in the reference plane RP will be referred to as directions D21 and D22.

In the present embodiment, as shown in FIG. 10, both of the two directions D21 and D22 are different from the direction Ds of the target magnetic field Hs in the reference plane RP. Further, the angle formed between the second direction Dk and the direction Ds of the target magnetic field Hs is an acute angle.

The direction D11, which is one of the two directions orthogonal to the first directions MP1 and MP2, is included in the variable range Rf of the direction Df of the acting magnetic field Hf. The direction D11 may be the same as the direction Rfc, which is in the middle of the variable range Rf of the direction Df of the acting magnetic field Hf.

The functions and effects of the position detection device 1 and the magnetic sensor 20 according to the present embodiment will now be described. The position detection device 1 is used to detect the position of the lens 5. In the present embodiment, when the position of the lens 5 relative to the substrate 7 varies in a direction parallel to the Z direction, the position of the magnet 13 relative to the magnetic sensor 20 also varies in the direction parallel to the Z direction. This varies the distance between the detection position P and the magnet 13, and as a result, varies the strength of the target magnetic field Hs.

In the present embodiment, the acting magnetic field Hf is a composite magnetic field of the target magnetic field Hs and the anisotropic magnetic field Hk. The direction Df of the acting magnetic field Hf varies as the strength of the target magnetic field Hs varies. The detection signal of the magnetic sensor 20 depends on the direction Df of the acting magnetic field Hf which varies according to the strength of the target magnetic field Hs. The detection signal thus varies according to the strength of the target magnetic field Hs. The strength of the target magnetic field Hs depends on the position of the lens 5 relative to the substrate 7. The detection signal thus corresponds to the position of the lens 5.

In the magnetic sensor 20, a reversal of the magnetization of the free layer 154 may occur due to, for example, a disturbance magnetic field applied thereto, so that the direction of the magnetization of the free layer 154 in the absence of an applied magnetic field may become opposite to the second direction Dk.

In the present embodiment, as shown in FIG. 10, both of the two directions D21 and D22 orthogonal to the second direction Dk in the reference plane RP are different from the direction Ds of the target magnetic field Hs. Further, the angle formed between the second direction Dk and the direction Ds of the target magnetic field Hs is an acute angle. Thus, according to the present embodiment, even if the magnetization of the free layer 154 is reversed by a disturbance magnetic field or the like as described above, the direction of the magnetization of the free layer 154 can subsequently be restored to the original direction, i.e., the second direction Dk, by the target magnetic field Hs acting on the free layer 154 upon disappearance of the disturbance magnetic field. The present embodiment thus makes it possible that even if a reversal of the magnetization of the free layer 154 occurs, the direction of the magnetization of the free layer 154 can easily be restored to the original direction without using any additional means or processing.

In the present embodiment, the direction D11, which is one of the two directions orthogonal to the first directions MP1 and MP2, is included in the variable range Rf of the direction Df of the acting magnetic field Hf. This enables the MR element 150 to operate within the linear region, and as a result, enables reduction of the offset of the detection signal of the magnetic sensor 20, and enhancement of the linearity of the detection signal. The direction D11 may be the same as the direction Rfc, which is in the middle of the variable range Rf of the direction Df of the acting magnetic field Hf.

Figure 11:
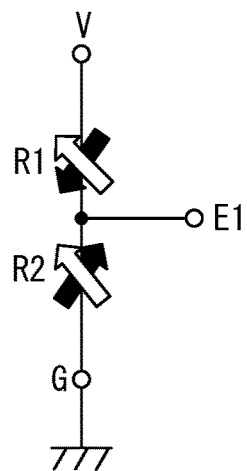
FIG. 11 is a circuit diagram illustrating a simulation model of a magnetic sensor.

Now, preferred conditions for the position detection device 1 and the magnetic sensor 20 according to the present embodiment will be described with reference to simulation results. FIG. 11 is a circuit diagram showing a simulation model of the magnetic sensor 20. The model includes the power supply port V, the ground port G, the output port E1, the first resistor section R1 and the second resistor section R2 among the components of the magnetic sensor 20 shown in FIG. 7. The first resistor section R1 is provided between the power supply port V and the output port E1. The second resistor section R2 is provided between the output port E1 and the ground port G. For this model, the electric potential at the output port E1 serves as the detection signal which varies according to the strength of the target magnetic field Hs.

The simulation evaluated the following four parameters: reversal magnetic field strength; sensitivity parameter; linearity parameter; and magnetic field strength difference.

The reversal magnetic field strength refers to the minimum value of the strength of an applied magnetic field needed to reverse the magnetization direction of the free layer 154 from one to the other of two mutually opposite directions parallel to the easy axis of magnetization of the free layer 154. The reversal magnetic field strength varies depending on the angle that the direction of the applied magnetic field forms with the easy axis of magnetization.

The sensitivity parameter refers to the ratio of a variation in the value of the detection signal to a variation in the strength of the target magnetic field Hs. The greater the sensitivity parameter, the higher the sensitivity.

The linearity parameter is a value determined in the following manner. Initially, a characteristic curve representing a relationship between the strength of the target magnetic field Hs and the value of the detection signal over the variable range of the strength of the target magnetic field Hs is determined. Next, an approximate straight line for the characteristic curve is determined. Next, a maximum value of the residuals of the values on the characteristic curve from the approximate straight line is determined within the variable range of the strength of the target magnetic field Hs. The linearity parameter is a value obtained by dividing the maximum value of the residuals by the size of the variable range of the value of the detection signal. The smaller the linearity parameter, the higher the linearity.

The magnetic field strength difference is a value obtained by subtracting a minimum value of the reversal magnetic field strength in all directions of the applied magnetic field from a maximum value Hsmax of the strength of the target magnetic field Hs. As described above, the reversal magnetic field strength varies depending on the angle that the direction of the applied magnetic field forms with the easy axis of magnetization. The relationship between this angle and the reversal magnetic field strength is expressed by an asteroid curve, for example. In such a case, the reversal magnetic field strength becomes maximum when the direction of the applied magnetic field forms an angle of 0° or 90° with the easy axis of magnetization, and becomes minimum when the direction of the applied magnetic field forms an angle of 45° with the easy axis of magnetization. Thus, in this case, the minimum value of the reversal magnetic field strength in all the directions of the applied magnetic field is the reversal magnetic field strength when the direction of the applied magnetic field forms an angle of 45° with the easy axis of magnetization.

As shown in FIG. 10, the angle that the direction D21, which is one of the two directions orthogonal to the second direction Dk, forms with the direction Ds of the target magnetic field Hs in the reference plane RP will be referred to as a tilt angle θt.

Figure 12:
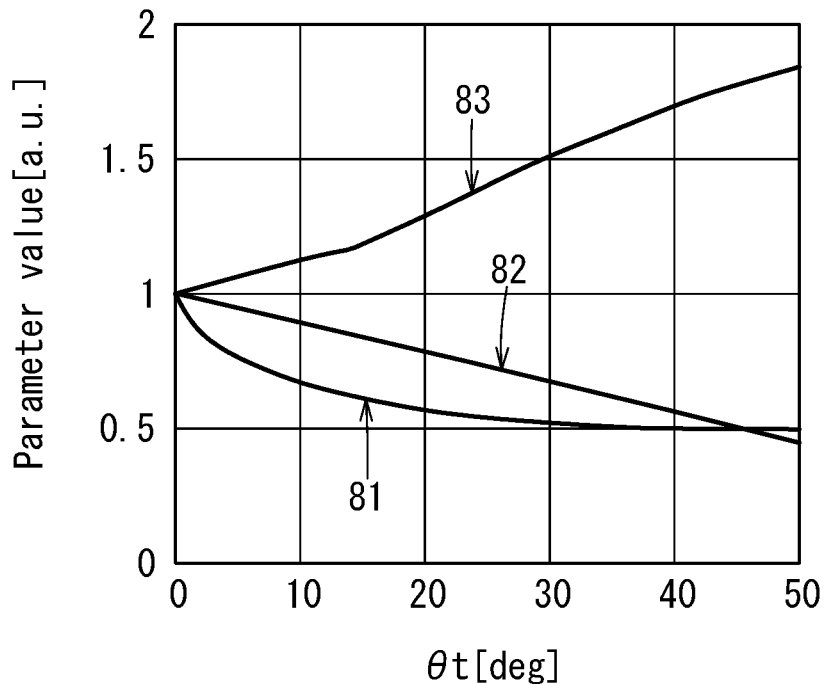
FIG. 12 is a characteristic diagram illustrating the simulation results.

The simulation initially determined the relationships of the tilt angle θt with the reversal magnetic field strength, the sensitivity parameter, and the linearity parameter. FIG. 12 is a characteristic diagram illustrating the relationships of the tilt angle θt with the reversal magnetic field strength, the sensitivity parameter, and the linearity parameter. In FIG. 12 the horizontal axis represents the tilt angle θt, and the vertical axis represents the reversal magnetic field strength, the sensitivity parameter, and the linearity parameter expressed in arbitrary units (a. u.). In FIG. 12 the line 81 represents the relationship of the tilt angle θt with the reversal magnetic field strength, the line 82 represents the relationship of the tilt angle θt with the sensitivity parameter, and the line 83 represents the relationship of the tilt angle θt with the linearity parameter.

In FIG. 12, as shown by the line 81, the reversal magnetic field strength has a substantially constant small value at tilt angles θt in the range of 40° to 50°. At tilt angles θt in the range of 0° to 40° the reversal magnetic field strength increases as the tilt angle θt decreases.

In FIG. 12, as shown by the lines 82 and 83, the sensitivity parameter decreases and the linearity parameter increases as the tilt angle θt increases in the range of 0° to 50°.

In terms only of facilitating the reversal of the magnetization of the free layer 154 by the target magnetic field Hs, the tilt angle θt preferably falls within the range of 40° to 50°. However, as can be seen from FIG. 12, the greater the tilt angle θt, the poorer the sensitivity and the linearity. The reason is that the variable range Rf of the direction Df of the acting magnetic field Hf becomes narrower as the tilt angle θt increases. Poor sensitivity and linearity are undesirable for the position detection apparatus 1 and the magnetic sensor 20. On the other hand, the reversal magnetic field strength becomes particularly high at tilt angles θt near 0°. In view of these, in the present embodiment the tilt angle θt is preferably greater than 0° and smaller than 45°, and more preferably in the range of 5° to 40°.

Figure 13:
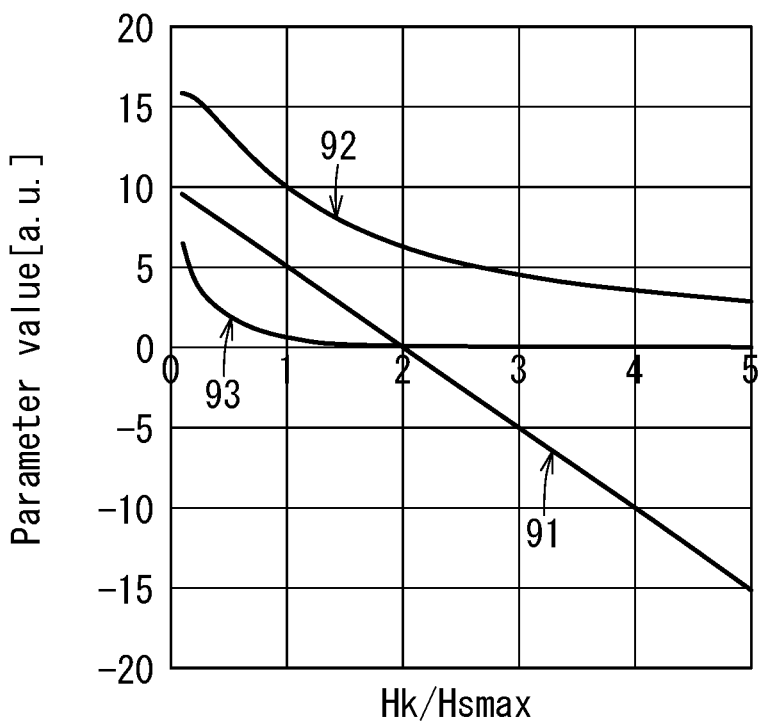
FIG. 13 is a characteristic diagram illustrating the simulation results.

The simulation then determined the relationships of the ratio of the strength of the anisotropic magnetic field Hk to the maximum value Hsmax of the strength of the target magnetic field Hs with the magnetic field strength difference, the sensitivity parameter, and the linearity parameter. The foregoing ratio will be denoted as Hk/Hsmax. FIG. 13 is a characteristic diagram illustrating the relationships of Hk/Hsmax with the magnetic field strength difference, the sensitivity parameter, and the linearity parameter. In FIG. 13, the horizontal axis represents Hk/Hsmax. The vertical axis represents the values of the magnetic field strength difference, the sensitivity parameter, and the linearity parameter expressed in arbitrary units (a. u.). A magnetic field strength difference of 0 in arbitrary units indicates that the maximum value Hsmax of the strength of the target magnetic field Hs minus the minimum value of the reversal magnetic field strength in all the directions of the applied magnetic field is 0. In FIG. 13 the line 91 represents the relationship of Hk/Hsmax with the magnetic field strength difference, the line 92 represents the relationship of Hk/Hsmax with the sensitivity parameter, and the line 93 represents the relationship of Hk/Hsmax with the linearity parameter.

To enable a reversal of the magnetization of the free layer 154 by the target magnetic field Hs, the magnetic field strength difference needs to be greater than or equal to 0, preferably greater than 0. As shown by the line 91 in FIG. 13, Hk/Hsmax therefore needs to be less than or equal to 2, preferably less than 2. In other words, the strength of the anisotropic magnetic field Hk needs to be lower than or equal to twice the maximum value Hsmax of the strength of the target magnetic field Hs, preferably lower than twice the maximum value Hsmax of the strength of the target magnetic field Hs.

On the other hand, as shown by the line 93 in FIG. 13, the linearity parameter is extremely large when Hk/Hsmax is near zero. Hk/Hsmax is thus preferably more than or equal to 0.5. In other words, the strength of the anisotropic magnetic field Hk is preferably higher than or equal to ½ the maximum value Hsmax of the strength of the target magnetic field Hs.

If the uniaxial magnetic anisotropy of the free layer 154 is magnetic shape anisotropy, the strength of the anisotropic magnetic field Hk can be controlled, for example, by the shape of the free layer 154. Here, let La represent the maximum length of the free layer 154 in the longitudinal direction when seen from above, and let Lb represent the maximum length of the free layer 154 in a direction orthogonal to the longitudinal direction when seen from above. The greater the value of La/Lb, the higher the strength of the anisotropic magnetic field Hk.

Second Embodiment

Figure 14:
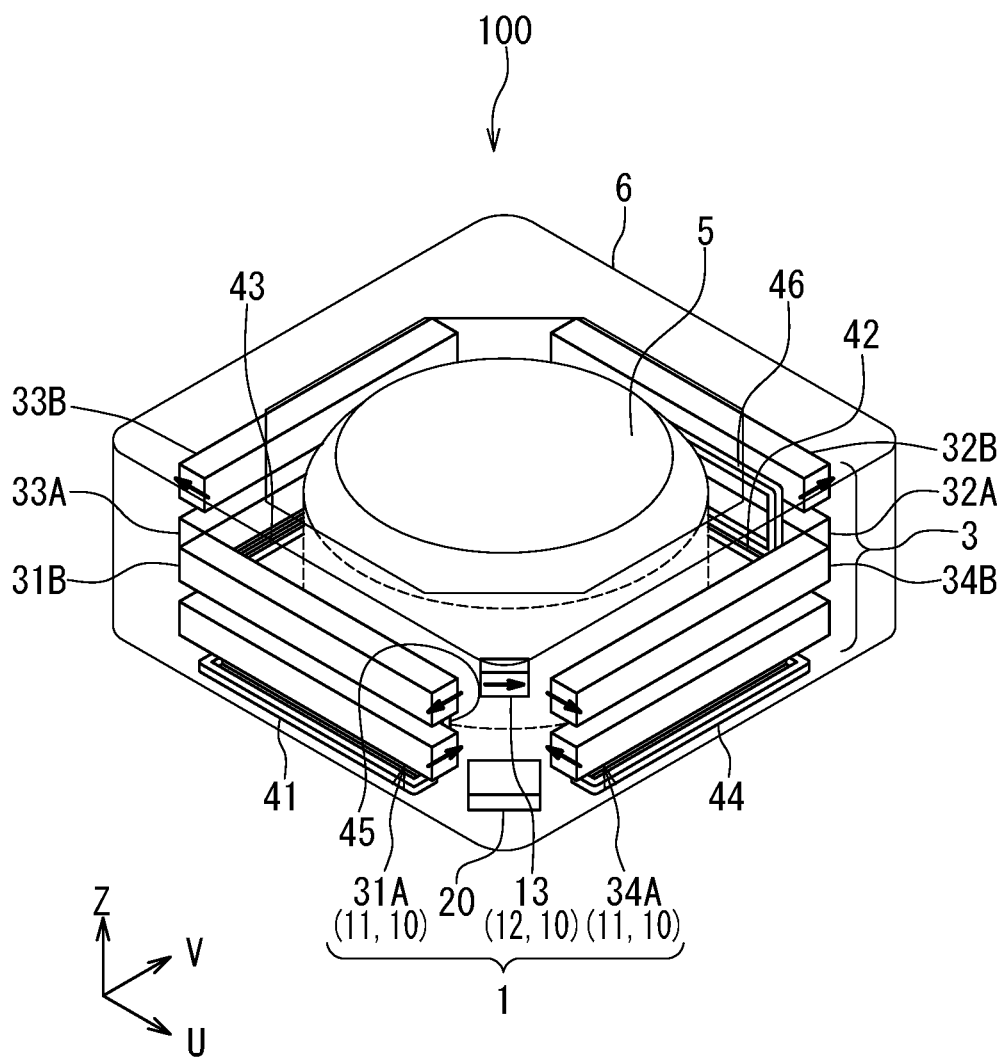
FIG. 14 is a perspective view of a camera module including a position detection device according to a second embodiment of the invention.

A second embodiment of the invention will now be described. First, reference is made to FIG. 14 to describe the differences of the camera module 100 including the position detection device 1 according to the second embodiment from the camera module 100 of the first embodiment. FIG. 14 is a perspective view of the camera module 100 of the second embodiment.

In the camera module 100 of the present embodiment, the magnets 33A, 33B, 34A and 34B of the driving device 3 are magnetized in different directions from those in the first embodiment. Specifically, in the present embodiment, the magnets 33A and 34B are magnetized in the U direction. The magnets 33B and 34A are magnetized in the −U direction.

In the position detection device 1 according to the present embodiment, the magnetic field generation unit 10 is different from that in the first embodiment in that it includes a first partial magnetic field generation unit 11 for generating a first partial magnetic field and a second partial magnetic field generation unit 12 for generating a second partial magnetic field.

The first partial magnetic field generation unit 11 is formed of the magnets 31A and 34A. The first partial magnetic field is a composite of magnetic fields that are respectively generated by the magnets 31A and 34A.

The second partial magnetic field generation unit 12 is formed of the magnet 13 of the first embodiment. The second partial magnetic field is a magnetic field generated by the magnet 13.

In the present embodiment, the predetermined magnetic field to be generated by the magnetic field generation unit 10 is a composite magnetic field of the first partial magnetic field and the second partial magnetic field.

Figure 15:
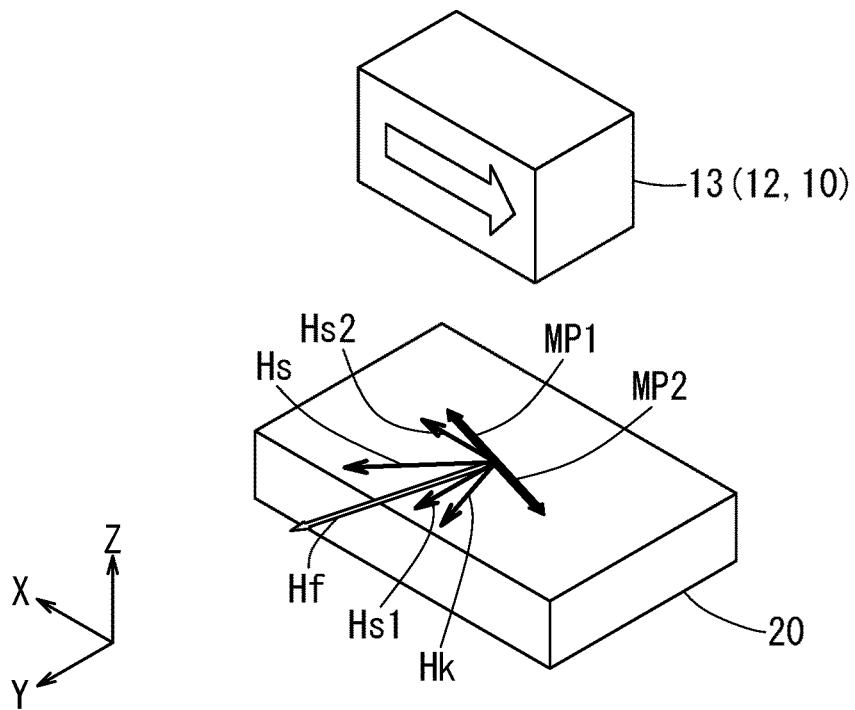
FIG. 15 is a perspective view illustrating the principal parts of the position detection device according to the second embodiment of the invention.

The position detection device 1 and the magnetic sensor 20 according to the present embodiment will now be described in detail. FIG. 15 is a perspective view illustrating the principal parts of the position detection device 1 according to the present embodiment. In the present embodiment, the magnetic sensor 20 of the position detection device 1 detects a detection-target magnetic field at a detection position in a reference plane, and generates a detection signal that varies according to the strength and direction of the detection-target magnetic field. The detection-target magnetic field is a magnetic field to be detected by the magnetic sensor 20. Hereinafter, the detection-target magnetic field at the detection position will be referred to as the target magnetic field Hs.

The magnetic field generation unit 10 and the magnetic sensor 20 are configured so that when the position of the lens 5 relative to the substrate 7 varies, the direction of the target magnetic field Hs varies within a variable range below 180°.

Here, a component of the first partial magnetic field at the detection position, the component being parallel to the reference plane, will be referred to the first magnetic field component, and denoted by the symbol Hs1. A component of the second partial magnetic field at the detection position, the component being parallel to the reference plane, will be referred to as the second magnetic field component, and denoted by the symbol Hs2. The target magnetic field Hs in the present embodiment is a composite magnetic field of the first magnetic field component Hs1 and the second magnetic field component Hs2. In FIG. 15, the arrow Hs1 indicates the strength and direction of the first magnetic field component Hs1, the arrow Hs2 indicates the strength and direction of the second magnetic field component Hs2, and the arrow Hs indicates the strength and direction of the target magnetic field Hs.

In the present embodiment, as shown in FIG. 15, the first magnetic field component Hs is in the Y direction, and the second magnetic field component Hs2 is in the X direction. When the position of the lens 5 relative to the substrate 7 varies in a direction parallel to the Z direction, the strength of the second magnetic field component Hs2 varies, whereas none of the strength and direction of the first magnetic field component Hs1 and the direction of the second magnetic field component Hs2 vary. In the present embodiment, the direction of the target magnetic field Hs varies within a variable range below 90°.

In the present embodiment, similarly to the first embodiment, the second direction Dk is the magnetization direction of the free layer 154 that is set in the initial state before use of the magnetic sensor 20. During use of the magnetic sensor 20, unless there occurs a reversal of the magnetization of the free layer 154 which is originally in the second direction Dk, the free layer 154 undergoes an anisotropic magnetic field Hk in the second direction Dk because of the uniaxial magnetic anisotropy.

The reference plane RP is a plane containing the direction Ds of the target magnetic field Hs, the first directions MP1 and MP2, and the second direction Dk. The first directions MP1 and MP2 and the second direction Dk in the present embodiment are different from those in the first embodiment. The acting magnetic field Hf is a composite magnetic field of the target magnetic field Hs and the anisotropic magnetic field Hk.

In FIG. 15, the arrow labeled MP1 represents the direction MP1, the arrow labeled MP2 represents the direction MP2, the arrow labeled Hk represents the strength and direction of the anisotropic magnetic field Hk, and the arrow labeled Hf represents the strength and direction of the acting magnetic field Hf.

Figure 16:
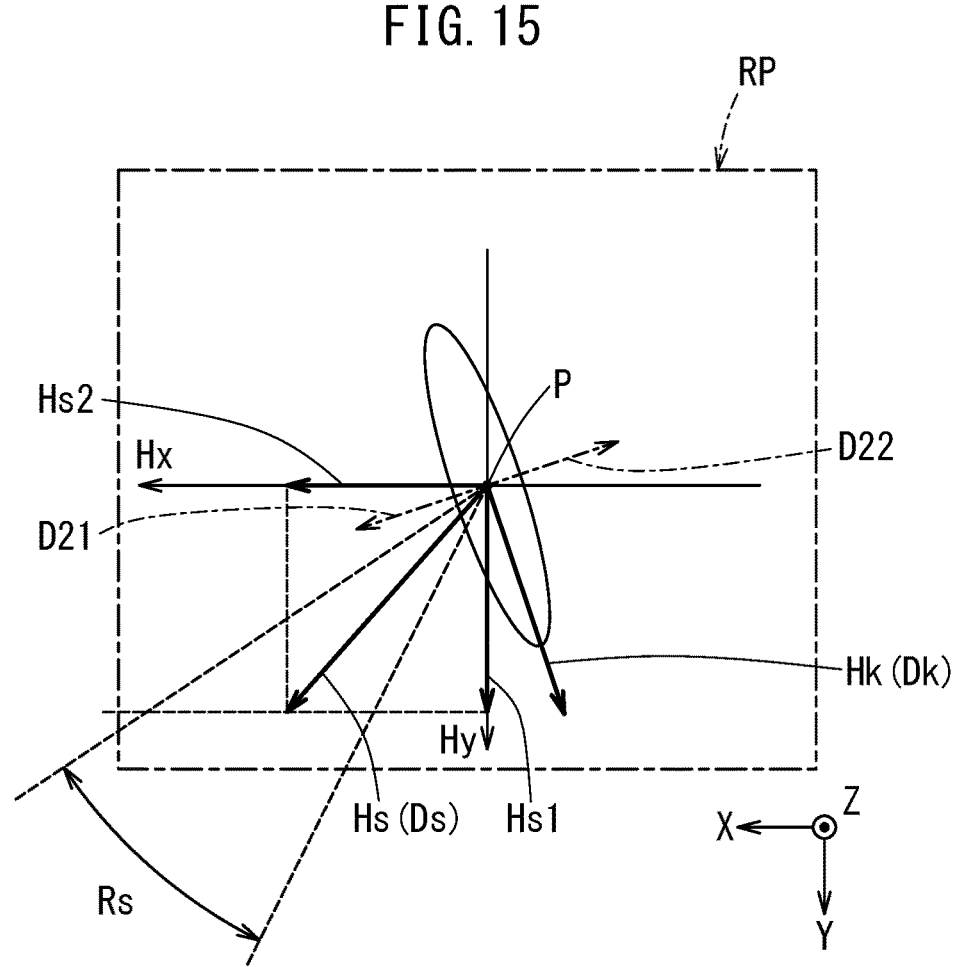
FIG. 16 is an explanatory diagram illustrating the second direction and the detection-target magnetic field in the second embodiment of the invention.

Reference is now made to FIG. 16 to describe in detail the second direction Dk and the target magnetic field Hs in the present embodiment. In FIG. 16 the symbol RP represents the reference plane, and the symbol P represents the detection position. In FIG. 16, the axis in the X direction represents the strength Hx of a magnetic field in the X direction, and the axis in the Y direction represents the strength Hy of a magnetic field in the Y direction. In FIG. 16 the arrow labeled Hk (Dk) indicates the strength of the anisotropic magnetic field Hk and the direction thereof, i.e., the second direction Dk. In FIG. 16 the arrow labeled Hs (Ds) indicates the strength and the direction Ds of the target magnetic field Hs. Further, FIG. 16 shows the variable range Rs of the direction Ds of the target magnetic field Hs. In the present embodiment, when the position of the lens 5 relative to the substrate 7 varies in a direction parallel to the Z direction, the strength of the second magnetic field component Hs2 varies, and as a result, the strength and the direction Ds of the target magnetic field Hs vary.

As in the first embodiment, two directions orthogonal to the second direction Dk in the reference plane RP will be referred to as directions D21 and D22. In the present embodiment, as shown in FIG. 16, neither of the two directions D21 and D22 orthogonal to the second direction Dk is included in the variable range Rs of the direction Ds of the target magnetic field Hs.

Figure 17:
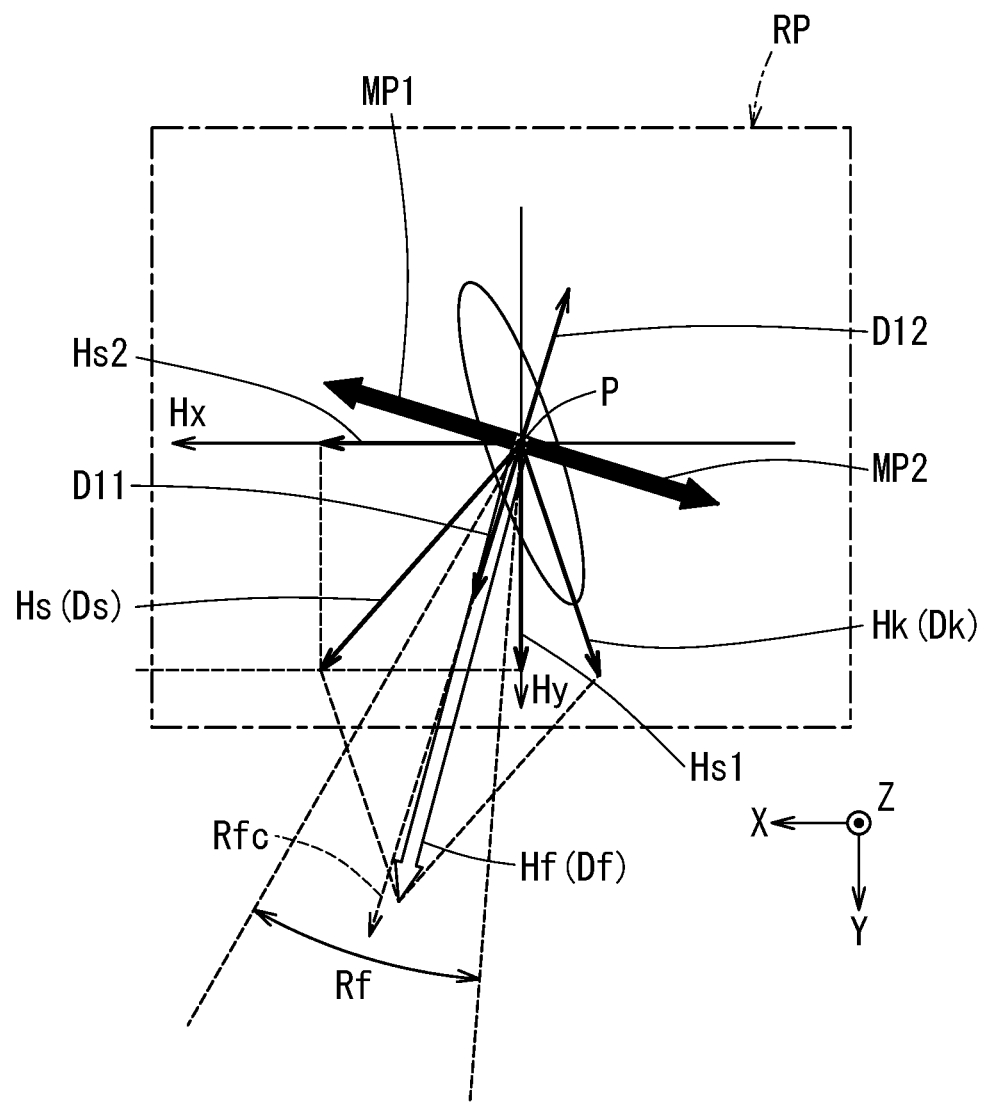
FIG. 17 is an explanatory diagram illustrating the first direction, the second direction, the detection-target magnetic field and the acting magnetic field in the second embodiment of the invention.

Reference is now made to FIG. 17 to describe in detail the first directions MP1 and MP2, the second direction Dk, the target magnetic field Hs, and the acting magnetic field Hf in the present embodiment. In FIG. 17 the symbol RP represents the reference plane, and the symbol P represents the detection position. In FIG. 17, the axis in the X direction represents the strength Hx of a magnetic field in the X direction, and the axis in the Y direction represents the strength Hy of a magnetic field in the Y direction. FIG. 17 shows the first directions MP1 and MP2. In FIG. 17 the arrow labeled Hk (Dk) indicates the strength of the anisotropic magnetic field Hk and the direction thereof, i.e., the second direction Dk. In FIG. 17 the arrow labeled Hs (Ds) indicates the strength and the direction Ds of the target magnetic field Hs, and the arrow labeled Hf (Df) indicates the strength and the direction Df of the acting magnetic field Hf.

The acting magnetic field Hf is a composite magnetic field of the target magnetic field Hs and the anisotropic magnetic field Hk. In the present embodiment, when the position of the lens 5 relative to the substrate 7 varies in a direction parallel to the Z direction, the strength of the second magnetic field component Hs2 varies, and as a result, the strength and the direction Ds of the target magnetic field Hs vary and also the direction Df of the acting magnetic field Hf varies. Since the strength of the second magnetic field component Hs2 varies within a predetermined range, the direction Df of the acting magnetic field Df also varies within a predetermined variable range. In FIG. 17, the symbol Rf represents the variable range of the direction Df of the acting magnetic field Hf, and the symbol Rfc represents the direction in the middle of the variable range Rf of the direction Df of the acting magnetic field Hf.

As shown in FIG. 17, the direction Dl1, which is one of the two directions orthogonal to the first directions MP1 and MP2, is included in the variable range Rf of the direction Df of the acting magnetic field Hf. The direction Dl1 may be the same as the direction Rfc, which is in the middle of the variable range Rf of the direction Df of the acting magnetic field Hf.

The functions and effects of the position detection device 1 and the magnetic sensor 20 according to the present embodiment will now be described. In the present embodiment, as described above, when the position of the lens 5 relative to the substrate 7 varies in a direction parallel to the Z direction, the strength and the direction Ds of the target magnetic field Hs vary, and also the direction Df of the acting magnetic field Hf varies. The detection signal of the magnetic sensor 20 depends on the direction Df of the acting magnetic field Hf, and the direction Df depends on the strength and the direction Ds of the target magnetic field Hs. The detection signal thus varies according to the strength and the direction Ds of the target magnetic field Hs. The strength and the direction Ds of the target magnetic field Hs depend on the position of the lens 5 relative to the substrate 7. The detection signal thus corresponds to the position of the lens 5.

In the magnetic sensor 20, a reversal of the magnetization of the free layer 154 may occur due to, for example, a disturbance magnetic field applied thereto, so that the direction of the magnetization of the free layer 154 in the absence of an applied magnetic field may become opposite to the second direction Dk.

In the present embodiment, as shown in FIG. 16, neither of the two directions D21 and D22 orthogonal to the second direction Dk in the reference plane RP are included in the variable range Rs of the direction Ds of the target magnetic field Hs. Further, the angle formed between the second direction Dk and the direction Ds of the target magnetic field Hs is an acute angle regardless of what direction within the variable range Rs the direction Ds of the target magnetic field Hs is. Thus, according to the present embodiment, even if the magnetization of the free layer 154 is reversed by a disturbance magnetic field or the like as described above, the direction of the magnetization of the free layer 154 can subsequently be restored to the original direction, i.e., the second direction Dk, by the target magnetic field Hs acting on the free layer 154 upon disappearance of the disturbance magnetic field. The present embodiment thus makes it possible that even if a reversal of the magnetization of the free layer 154 occurs, the direction of the magnetization of the free layer 154 can easily be restored to the original direction without using any additional means or processing.

In the present embodiment, as shown in FIG. 17, one of the two directions orthogonal to the first directions MP1 and MP2, i.e., the direction Dl, is included in the variable range Rf of the direction Df of the acting magnetic field Hf. This enables the MR element 150 to operate within the linear region, and as a result, enables reduction of the offset of the detection signal of the magnetic sensor 20, and enhancement of the linearity of the detection signal. The direction D11 may be the same as the direction Rfc, which is in the middle of the variable range Rf of the direction Df of the acting magnetic field Hf.

In the present embodiment also, like the first embodiment, the strength of the anisotropic magnetic field Hk is preferably lower than twice the maximum value of the strength of the target magnetic field Hs and higher than or equal to ½ the maximum value of the strength of the target magnetic field Hs.

The configuration, operation and effects of the present embodiment are otherwise the same as those of the first embodiment.

The present invention is not limited to the foregoing embodiments, and various modifications may be made thereto. For example, in the present invention the uniaxial magnetic anisotropy of the free layer may be other than magnetic shape anisotropy, and may be magnetocrystalline anisotropy, for example.

The position detection device of the present invention is usable to detect not only a lens position but also the position of any object moving in a predetermined direction.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. A magnetic sensor for generating a detection signal that varies according to a strength of a detection-target magnetic field at a predetermined detection position, the detection-target magnetic field being in a predetermined direction, the detection-target magnetic field at the detection position being part of a predetermined magnetic field, the magnetic sensor comprising at least one magnetoresistive element, wherein the at least one magnetoresistive element includes a magnetization pinned layer having a magnetization in a first direction, and a free layer having a magnetization whose direction is variable according to a direction of an acting magnetic field, the acting magnetic field being a composite magnetic field of all magnetic fields acting on the free layer, the free layer has uniaxial magnetic anisotropy such that an easy axis of magnetization is oriented in a direction parallel to a second direction, and the second direction is the direction of the magnetization of the free layer set in an initial state, and a direction of the detection-target magnetic field at the detection position is not orthogonal to the easy axis of magnetization of the uniaxial magnetic anisotropy.

2. The magnetic sensor according to claim 1, wherein the uniaxial magnetic anisotropy is magnetic shape anisotropy.

3. The magnetic sensor according to claim 1, wherein an angle formed between one direction parallel to the easy axis of magnetization of the uniaxial magnetic anisotropy and the direction of the detection-target magnetic field at the detection position is an acute angle.

4. The magnetic sensor according to claim 1, wherein the at least one magnetoresistive element is configured so that a direction orthogonal to the direction of the magnetization of the magnetization pinned layer is included in a variable range of the direction of the acting magnetic field.

5. The magnetic sensor according to claim 4, wherein the at least one magnetoresistive element is configured so that the direction orthogonal to the direction of the magnetization of the magnetization pinned layer is the same as a direction in the middle of the variable range of the direction of the acting magnetic field.

6. The magnetic sensor according to claim 1, wherein the at least one magnetoresistive element is configured so that a direction orthogonal to the easy axis of magnetization of the uniaxial magnetic anisotropy forms an angle greater than 0° and smaller than 45° with the direction of the detection-target magnetic field at the detection position.

7. The magnetic sensor according to claim 1, wherein an anisotropic magnetic field acting on the free layer due to the uniaxial magnetic anisotropy has a strength lower than twice a maximum value of the strength of the detection-target magnetic field at the detection position.

8. A position detection device for detecting a position of a target object that is variable in position, the position detection device comprising:

a magnetic field generation unit for generating a predetermined magnetic field; and a magnetic sensor for detecting a detection-target magnetic field at a predetermined detection position, the detection-target magnetic field being in a predetermined direction and being part of the predetermined magnetic field, wherein the magnetic field generation unit and the magnetic sensor are configured so that when the position of the target object varies, the detection-target magnetic field varies in strength at the detection position, the magnetic sensor is configured to generate a detection signal that varies according to the strength of the detection-target magnetic field at the detection position, the magnetic sensor includes at least one magnetoresistive element, the at least one magnetoresistive element includes a magnetization pinned layer having a magnetization in a first direction, and a free layer having a magnetization whose direction is variable according to a direction of an acting magnetic field, the acting magnetic field being a composite magnetic field of all magnetic fields acting on the free layer, the free layer has uniaxial magnetic anisotropy such that an easy axis of magnetization is oriented in a direction parallel to a second direction, and the second direction is the direction of the magnetization of the free layer set in an initial state, and a direction of the detection-target magnetic field at the detection position is not orthogonal to the easy axis of magnetization of the uniaxial magnetic anisotropy.

9. A magnetic sensor for generating a detection signal that varies according to at least one of a strength or a direction of a detection-target magnetic field at a predetermined detection position, wherein the detection-target magnetic field at the detection position is part of a predetermined magnetic field, the direction of the detection-target magnetic field at the detection position varies within a variable range below 180°, the magnetic sensor includes at least one magnetoresistive element, the at least one magnetoresistive element includes a magnetization pinned layer having a magnetization in a first direction, and a free layer having a magnetization whose direction is variable according to a direction of an acting magnetic field, the acting magnetic field being a composite magnetic field of all magnetic fields acting on the free layer, the free layer has uniaxial magnetic anisotropy such that an easy axis of magnetization is oriented in a direction parallel to a second direction, and the second direction is the direction of the magnetization of the free layer set in an initial state, and the at least one magnetoresistive element is configured so that a direction orthogonal to the easy axis of magnetization of the uniaxial magnetic anisotropy is not included in the variable range of the direction of the detection-target magnetic field at the detection position.

10. The magnetic sensor according to claim 9, wherein the uniaxial magnetic anisotropy is magnetic shape anisotropy.

11. The magnetic sensor according to claim 9, wherein an angle formed between one direction parallel to the easy axis of magnetization of the uniaxial magnetic anisotropy and the direction of the detection-target magnetic field at the detection position is an acute angle.

12. The magnetic sensor according to claim 9, wherein the at least one magnetoresistive element is configured so that a direction orthogonal to the direction of the magnetization of the magnetization pinned layer is included in a variable range of the direction of the acting magnetic field.

13. The magnetic sensor according to claim 12, wherein the at least one magnetoresistive element is configured so that the direction orthogonal to the direction of the magnetization of the magnetization pinned layer is the same as a direction in the middle of the variable range of the direction of the acting magnetic field.

14. The magnetic sensor according to claim 9, wherein an anisotropic magnetic field acting on the free layer due to the uniaxial magnetic anisotropy has a strength lower than twice a maximum value of the strength of the detection-target magnetic field at the detection position.

15. A position detection device for detecting a position of a target object that is variable in position, the position detection device comprising:

a magnetic field generation unit for generating a predetermined magnetic field; and a magnetic sensor for detecting a detection-target magnetic field at a predetermined detection position, the detection-target magnetic field being part of the predetermined magnetic field, wherein the magnetic field generation unit and the magnetic sensor are configured so that when the position of the target object varies, a direction of the detection-target magnetic field at the detection position varies within a variable range below 180°, the magnetic sensor is configured to generate a detection signal that varies according to at least one of a strength or the direction of the detection-target magnetic field at the detection position, the magnetic sensor includes at least one magnetoresistive element, the at least one magnetoresistive element includes a magnetization pinned layer having a magnetization in a first direction, and a free layer having a magnetization whose direction is variable according to a direction of an acting magnetic field, the acting magnetic field being a composite magnetic field of all magnetic fields acting on the free layer, the free layer has uniaxial magnetic anisotropy such that an easy axis of magnetization is oriented in a direction parallel to a second direction, and the second direction is the direction of the magnetization of the free layer set in an initial state, and the at least one magnetoresistive element is configured so that a direction orthogonal to the easy axis of magnetization of the uniaxial magnetic anisotropy is not included in the variable range of the direction of the detection-target magnetic field at the detection position.

16. The position detection device according to claim 15, wherein the magnetic field generation unit includes a first partial magnetic field generation unit for generating a first partial magnetic field, and a second partial magnetic field generation unit for generating a second partial magnetic field, the predetermined magnetic field is a composite magnetic field of the first partial magnetic field and the second partial magnetic field, when the position of the target object varies, a strength of a second magnetic field component varies whereas none of a strength and direction of a first magnetic field component and a direction of the second magnetic field component vary, wherein the first magnetic field component is a component of the first partial magnetic field at the detection position, and the second magnetic field component is a component of the second partial magnetic field at the detection position, and the detection-target magnetic field at the detection position is a composite magnetic field of the first magnetic field component and the second magnetic field component.

17. A position detection device for detecting a position of a target object that is variable in position, the position detection device comprising:

a magnetic field generation unit for generating a predetermined magnetic field; and a magnetic sensor for detecting a detection-target magnetic field at a predetermined detection position, the detection-target magnetic field being part of the predetermined magnetic field, wherein the magnetic field generation unit and the magnetic sensor are configured so that when the position of the target object varies, a direction of the detection-target magnetic field at the detection position varies within a variable range below 180°, the magnetic sensor is configured to generate a detection signal that varies according to at least one of a strength or the direction of the detection-target magnetic field at the detection position, the magnetic sensor includes at least one magnetoresistive element, the at least one magnetoresistive element includes a magnetization pinned layer having a magnetization in a first direction, and a free layer having a magnetization whose direction is variable according to a direction of an acting magnetic field, the acting magnetic field being a composite magnetic field of all magnetic fields acting on the free layer, the free layer has uniaxial magnetic anisotropy such that an easy axis of magnetization is oriented in a direction parallel to a second direction, the at least one magnetoresistive element is configured so that a direction orthogonal to the easy axis of magnetization of the uniaxial magnetic anisotropy is not included in the variable range of the direction of the detection-target magnetic field at the detection position, the magnetic field generation unit includes a first partial magnetic field generation unit for generating a first partial magnetic field, and a second partial magnetic field generation unit for generating a second partial magnetic field, the predetermined magnetic field is a composite magnetic field of the first partial magnetic field and the second partial magnetic field, when the position of the target object varies, a strength of a second magnetic field component varies whereas none of a strength and direction of a first magnetic field component and a direction of the second magnetic field component vary, wherein the first magnetic field component is a component of the first partial magnetic field at the detection position, and the second magnetic field component is a component of the second partial magnetic field at the detection position, and the detection-target magnetic field at the detection position is a composite magnetic field of the first magnetic field component and the second magnetic field component.

* * * * *